(12) United States Patent
Weber

(10) Patent No.: US 12,122,319 B2
(45) Date of Patent: Oct. 22, 2024

(54) GAS GENERATOR PARTICULARLY FOR A VEHICLE SAFETY SYSTEM

(71) Applicant: ZF Airbag Germany GmbH, Aschau a. Inn (DE)

(72) Inventor: Bernd Weber, Erharting (DE)

(73) Assignee: ZF AIRBAG GERMANY GMBH

( * ) Notice: Subject to any disclaimer, the term of this patent is extended or adjusted under 35 U.S.C. 154(b) by 10 days.

(21) Appl. No.: 17/786,196

(22) PCT Filed: Dec. 8, 2020

(86) PCT No.: PCT/EP2020/085024
§ 371 (c)(1),
(2) Date: Jun. 16, 2022

(87) PCT Pub. No.: WO2021/122142
PCT Pub. Date: Jun. 24, 2021

(65) Prior Publication Data
US 2023/0015275 A1    Jan. 19, 2023

(30) Foreign Application Priority Data
Dec. 18, 2019 (DE) .......................... 102019134899.4

(51) Int. Cl.
*B60R 21/26* (2011.01)
*B60R 21/261* (2011.01)
*B60R 21/264* (2006.01)

(52) U.S. Cl.
CPC .......... *B60R 21/2644* (2013.01); *B60R 21/26* (2013.01); *B60R 21/261* (2013.01);
(Continued)

(58) Field of Classification Search
CPC .......... B60R 21/26; B60R 2021/26076; B60R 2021/26082; B60R 2021/26088
See application file for complete search history.

(56) References Cited

U.S. PATENT DOCUMENTS 5,487,559 A * 1/1996 Headley .............. B60R 21/0173
280/741
5,596,163 A * 1/1997 Caflisch .............. B60R 21/2644
102/202.7
(Continued)

FOREIGN PATENT DOCUMENTS

DE    10236508 A1    8/2003
DE    20309808 U1    4/2004
(Continued)

OTHER PUBLICATIONS

International Search Report and Written Opinion for PCT/EP2020/085024 mailed Mar. 23, 2021 (23 pages; with English translation).

*Primary Examiner* — Barry Gooden, Jr.
(74) *Attorney, Agent, or Firm* — Kristin L. Murphy

(57) ABSTRACT

The disclosure relates to a gas generator—for a vehicle safety system, comprising an ignition unit including a holding element, an igniter and a base. The base is formed by one single plastic injection molding such that the igniter is embedded in the base and the base is injection-molded to the holding element. A membrane which hermetically seals an inner first opening of the holding element is provided.

14 Claims, 2 Drawing Sheets

(52) U.S. Cl.
CPC ............... *B60R 2021/26029* (2013.01); *B60R 2021/26076* (2013.01); *B60R 2021/26082* (2013.01); *B60R 2021/26088* (2013.01); *B60R 2021/2612* (2013.01)

(56) References Cited

U.S. PATENT DOCUMENTS

| | | | | |
|---|---|---|---|---|
| 6,007,096 | A * | 12/1999 | Shirk | F42B 3/125 280/736 |
| 6,139,055 | A * | 10/2000 | Dahl | B60R 21/2644 280/741 |
| 6,230,624 | B1 * | 5/2001 | Chatley, Jr. | C06B 21/005 149/93 |
| 6,244,622 | B1 | 6/2001 | Al-Amin et al. | |
| 8,573,130 | B2 * | 11/2013 | Chen | B60R 21/272 280/736 |
| 8,820,245 | B1 * | 9/2014 | Quioc | B60R 21/2644 102/530 |
| 9,050,944 | B1 * | 6/2015 | Quioc | B60R 21/26 |
| 9,656,626 | B2 * | 5/2017 | Ohsugi | B60R 21/26 |
| 9,944,249 | B2 * | 4/2018 | Okuyama | B60R 21/264 |
| 9,945,645 | B2 * | 4/2018 | Yamauchi | F42B 3/121 |
| 10,060,452 | B2 * | 8/2018 | Yamada | F15B 15/19 |
| 11,685,335 | B2 * | 6/2023 | Noda | B60R 21/2644 280/741 |
| 2002/0113420 | A1 | 8/2002 | Neunzert et al. | |
| 2004/0226472 | A1 | 11/2004 | Oda | |
| 2004/0232679 | A1 * | 11/2004 | Kubo | B60R 21/26 280/741 |
| 2004/0251667 | A1 * | 12/2004 | Harada | F42B 3/107 280/736 |
| 2005/0121894 | A1 * | 6/2005 | Brisighella, Jr. | B60R 21/26 280/741 |
| 2007/0186797 | A1 * | 8/2007 | Kurita | F42B 3/04 102/530 |
| 2007/0273132 | A1 * | 11/2007 | Smith | B60R 21/2644 280/736 |
| 2008/0022880 | A1 * | 1/2008 | Bierwirth | B60R 21/2644 102/202.14 |
| 2011/0101651 | A1 * | 5/2011 | Bierwirth | B60R 21/2644 280/741 |
| 2012/0024186 | A1 * | 2/2012 | Mitsunabe | F42B 3/103 102/530 |
| 2012/0079959 | A1 | 4/2012 | Chen et al. | |
| 2013/0276660 | A1 * | 10/2013 | Ukita | B60R 21/26 102/530 |
| 2014/0096697 | A1 * | 4/2014 | Okuyama | C06D 5/00 102/530 |
| 2014/0144343 | A1 * | 5/2014 | Smith | F42B 3/04 102/530 |
| 2014/0311375 | A1 * | 10/2014 | Divo | B29C 45/14598 102/530 |
| 2015/0021888 | A1 * | 1/2015 | Dogarescu | B60R 21/264 280/741 |
| 2015/0217717 | A1 * | 8/2015 | Ohsugi | B01J 7/00 102/530 |
| 2016/0016531 | A1 * | 1/2016 | Seidl | B60R 21/274 102/202.5 |
| 2016/0052486 | A1 * | 2/2016 | Ohsugi | B60R 21/26 102/530 |
| 2016/0362082 | A1 * | 12/2016 | Okuyama | B60R 21/264 |
| 2017/0028963 | A1 * | 2/2017 | Katsuta | B60R 21/264 |
| 2017/0210333 | A1 * | 7/2017 | Imai | B60R 21/262 |
| 2017/0363396 | A1 * | 12/2017 | Dürschinger | B60R 21/26 |
| 2018/0312132 | A1 * | 11/2018 | Ohsugi | B60R 21/264 |
| 2019/0054891 | A1 * | 2/2019 | Tanaka | B60R 21/2644 |
| 2020/0122681 | A1 * | 4/2020 | Divo | B60R 21/264 |
| 2020/0139925 | A1 * | 5/2020 | Koyama | B60R 21/264 |
| 2020/0172044 | A1 * | 6/2020 | Yamamoto | B01J 7/00 |
| 2020/0216011 | A1 * | 7/2020 | Yamamoto | B01J 7/00 |
| 2021/0016740 | A1 * | 1/2021 | Prima | B60R 21/2644 |
| 2021/0394703 | A1 * | 12/2021 | Cox | B60R 21/264 |
| 2021/0402950 | A1 * | 12/2021 | Englbrecht | B60R 21/2644 |
| 2022/0185223 | A1 * | 6/2022 | Noda | B60R 21/2644 |

FOREIGN PATENT DOCUMENTS

| | | | | |
|---|---|---|---|---|
| DE | 102007040381 A1 * | 3/2008 | | B60R 21/26 |
| DE | 60132371 T2 | 12/2008 | | |
| DE | 102009013603 A1 | 9/2010 | | |
| DE | 102010062382 A1 * | 9/2011 | | B60R 21/26 |
| DE | 202010015215 U1 * | 4/2012 | | B60R 21/264 |
| DE | 102013211218 A1 * | 12/2014 | | B60R 21/26 |
| DE | 202013008251 U1 | 2/2015 | | B60R 21/2644 |
| DE | 102015014124 A1 * | 5/2017 | | B60R 21/26 |
| DE | 102017128886 A1 | 6/2019 | | |
| DE | 102019131394 A1 * | 5/2021 | | B60R 21/2644 |
| EP | 0943503 A2 | 9/1999 | | |
| EP | 1298016 A1 * | 4/2003 | | F42B 3/04 |
| JP | 2009126292 A | 6/2009 | | |
| WO | WO-2004062787 A1 * | 7/2004 | | B60R 21/2644 |
| WO | 2010037516 A2 | 4/2010 | | |

* cited by examiner

GAS GENERATOR PARTICULARLY FOR A VEHICLE SAFETY SYSTEM

CROSS-REFERENCE TO RELATED APPLICATIONS

This application is a national stage of International Application No. PCT/EP2020/085024, filed Oct. 8, 2020, the disclosure of which is incorporated herein by reference in its entirety, and which claimed priority to German Patent Application No. 102019134899.4, filed Dec. 18, 2019, the disclosure of which is incorporated herein by reference in its entirety.

TECHNICAL FIELD

The disclosure relates to a gas generator, specifically for a vehicle safety system. Further, the disclosure deals with an airbag module comprising such gas generator and with a vehicle safety system comprising such gas generator.

BACKGROUND

Gas generators supply gas for filling an airbag, for example, or for driving a belt tensioner of a seat belt system or for an actuator component.

The document WO 2010/037516 discloses a gas generator, particularly for a vehicle safety system, comprising an ignition unit including a holding element, an igniter and a base, the base being formed by one single plastic injection molding so that the igniter is embedded in the base and the base is injection-molded to the holding element.

It is a drawback of such a design that, for sealing or tightness of the gas generator against environmental influences from the environment of the gas generator, expensive and complicated measures must be taken by applying a sealant in liquid or pasty form from outside, viz. from the environment of the gas generator, in a region of an outer opening of the holding element and by curing the same. Corresponding handling during assembly of such a known gas generator is time-consuming and cost-intensive. In addition, the sealant is not applied to a single component or element of the gas generator but between the holding element and the base. Since the holding element and the base are made from different materials, the selection and the way of application of the sealant are limited so as to ensure a properly adhering sealing between the two components.

SUMMARY

Against this background, what is needed is a design that eliminates or mitigates at least one of the afore-mentioned drawbacks. In particular, the disclosure is intended to state a gas generator that has components of simple design which are connected to one another by simple connecting technologies.

A developed airbag module, a vehicle safety system and a method for operating a gas generator is also needed.

The gas generator according to the disclosure has an ignition unit including a holding element, an igniter and a base, the base being formed by a single plastic injection molding such that the igniter is embedded in the base and the base is injection-molded to the holding element, with a membrane being provided which hermetically seals an inner first opening of the holding element. By providing, according to the disclosure, a membrane that hermetically seals an inner first opening of the holding element, a sealing or a measure or component for producing or increasing a tightness of the gas generator against its environment can be dispensed with in the outer region of the gas generator. In accordance with the present disclosure, on the one hand, the term "inner" first opening of the holding element means that it is an opening located inside or in the interior of the gas generator. In other words, said "inner" first opening of the holding element is not located in the outer region of the gas generator and, resp., does not form or is not a portion of the outer housing or of the outer contour of the gas generator. In other words, the "inner" first opening of the holding element is not directly accessible from the environment of the gas generator, for example by environmental influences.

On the other hand, in accordance with the present disclosure, the term to seal "hermetically" means that the inner first opening is sealed technically tightly by the membrane. For the sake of completeness, it is additionally mentioned in this context that "technically tight" includes the terms watertight and gastight, but absolute tightness against any diffusion processes which are naturally always given is excluded from this.

Hence, the igniter is fastened and, resp., held in the holding element by a plastic injection molding which is in the form of a base. This results in an easily and inexpensively manufacturable ignition unit comprising the three components of igniter, base and holding element. As the inner first opening of the holding element is hermetically sealed by the membrane, the ignition unit together with the membrane forms a compact assembly group which is tight toward an inner side, viz. in the region of the inner first opening of the holding element, against environmental influences. In particular, the ignition unit can be configured as an extremely space-saving assembly group. The ignition unit itself may have a diameter of only 2 to 4 times. In one exemplary arrangement, the ignition unit has a diameter of 2.5 times the diameter of the igniter. Thus, the ignition unit may have an extremely small diameter and, resp., an extremely space-saving extension in the radial direction. This allows for cost-effective mounting or further installing of the ignition unit in further components of the gas generator, particularly in a closure bottom.

In one exemplary arrangement, the holding element is configured as an elongate sleeve-shaped hollow body having a first opening located inside the gas generator and having a second opening opposite on the front side thereof, wherein the holding element and the membrane are made from metal and are materially connected by a first joint, with the membrane being in the form of a planar disk. Thus, the hollow body is a hollow body open on both sides. The material connection of the holding element and the membrane may be made using a radially peripheral weld, for example, and allows for a high degree of reliability in terms of a hermetic sealing of the inner first opening of the holding element.

The term "planar" disk means, in accordance with the disclosure, that the membrane is formed as a substantially flat and plane disk in the radial direction of extension without any sections or peripheries projecting axially therefrom. Accordingly, it is not a cup-shaped design which would have a radial bottom area and a wall area bent relative thereto. In accordance with the disclosure, the term "planar" nevertheless includes the fact that the disk may have one or more predetermined breaking points or points of a defined smaller material thickness on one or both of its opposite front sides, as it is known from the state of the art, for example, for the purpose of better tearing or breaking up at said points after activating the gas generator.

Equally, the term "planar" also includes, in accordance with the disclosure, that the disk flat in itself is formed, deformed or bent as a whole by a bulge or deflection by being pressurized, such as before or after the gas generator is activated.

In a cost-effective configuration, the membrane thus can be a disk of metal manufactured, such as punched out, of metal which can be easily manufactured from a sheet metal strip, for example of steel, copper or aluminum.

In one exemplary arrangement, the holding element is free, along its outer and inner contours, from an undercut, and/or the base can extend invariably along an inner wall of the holding element. Due to the fact that no complex contour such as an undercut is arranged on the holding element, the latter can be manufactured extremely cost-effectively. In particular, no expensive machining such as turning or milling is required. In accordance with the disclosure, the term "inner wall" of the holding element has to be understood as follows. The holding element has, with respect to its longitudinal extension, two opposite ends each having a front side or front face which define the respective maximum extension of the holding element there. The inner first opening is formed at one of the ends and a second (outer) opening is formed at the end opposite thereto so that the first and second openings are communicated with each other and, thus, form a passage or break-through for passing material between the two front faces. In other words, the holding element constitutes an elongate hollow body open on both sides which has a wall of a certain wall thickness and at whose one front face the first opening is formed and at whose front face opposite thereto the second opening is formed. The "inner wall" of the holding element is understood to be the inner wall area of the hollow body extending from one opening at a front face inside the hollow body to the other opening at the front face opposite thereto, wherein the front faces themselves are no more attributed to an area of the "inner wall" of the holding element.

By the base extending invariably along an inner wall of the holding element, the plastic injection molding by which the base is formed can be arranged in a defined small area of the holding element in a space-saving and cost-saving manner. For example, it is not necessary to encompass an annular plastic injection molding from the inner wall of the holding element to an outer wall of the holding element. In this way, mechanical tensions having a negative effect which would form during cooling of the plastic injection molding can be avoided, as this could be the case, if the plastic injection molding extended from the inner wall via an opening of the holding element toward or onto the outer wall thereof.

The holding element may have, in the area of its first opening, a first lengthening which projects from the igniter as regards its longitudinal extension, wherein an area of the first lengthening is configured as a radially outwardly widening conical area. In addition, or alternatively, the ignition unit may be adapted to be fabricated as pre-assembled group. The simple and compact structure of the ignition unit suggests feeding the same as an already pre-assembled group when manufacturing the gas generator. In addition, a further advantageous pre-assembled group can be manufactured of the ignition unit and the membrane fastened on the first opening.

The lengthening and, resp., the front-face end thereof defines the first opening. In a simple case, the lengthening is a circularly hollow-cylindrical end of the holding element. The lengthening extends in the axial longitudinal direction beyond the igniter. In other words, the igniter does not protrude, with respect to the longitudinal extension thereof, to the longitudinal extension of the lengthening. In other words, the lengthening projects somewhat from or beyond the igniter. Such a configuration of the lengthening allows for manufacturing or processing the ignition unit particularly well as pre-assembled group. As the lengthening protrudes somewhat from or beyond the igniter, the more sensitive igniter can be protected by the lengthening, such as from inadvertent mechanical force effects or contacts with other pre-assembled groups or components, if the latter are handled as bulk material in a spiral conveyor, for example, during manufacture of the gas generator.

In particular, the holding element may have at is inner wall a constriction through which the igniter extends at least in portions, wherein, when viewed in the longitudinal section, the constriction is configured toward a central axis of the holding element in curved shape, specifically in the form of a circle segment, such that a concave-convex-concave contour forms along the inner wall, the holding element being free from a geometrically formed anti-twist protection for the igniter and/or the base.

The constriction in the interior of the holding element constitutes a reduction of diameter relative to an inner diameter of the holding element. In other words, the constriction is a narrowing provided in the interior of the holding element which, on the one hand, increases the surface of the inner wall along the longitudinal extension of the holding element and, thus, provides a relatively large contact surface and hence adhesive surface or friction surface for the base abutting on the inner wall over a large area. On the other hand, the constriction constitutes a bottleneck for the igniter and/or the base so that, in the case of operation of the gas generator, pressure formed in the gas generator, for example acting from the first opening of the holding element, cannot inadvertently press out or force out the igniter and/or the base through the bottleneck into the environment of the gas generator.

In addition, the constriction is configured harmonically and, resp., balanced as regards its geometric configuration, in particular along its longitudinal extension, by having a curved design, and in one exemplary arrangement, in the form of a circle segment, resulting, after injection-molding a plastic material in the area of the constriction, in a cooling of the plastic material and, thus, formation of the base which optimally is void-free and free from any significant mechanical tensions. The term "concave-convex-concave contour" means in this context that the constriction at its smallest inner diameter forms a convex contour portion, viz. a curved contour having an arc curvature toward the central axis of the holding element, wherein a concave contour portion is connected to said convex contour portion on each of its two axially adjacent sides, there resulting in a radius of curvature having opposite signs, compared to the radius of curvature of the convex contour portion. In other words, when considering from the first opening of the holding element the inner contour of the holding element or theoretically "retracing" the path of said contour, then first a concave contour portion is resulting which "guides" or forms the contour in a curved way radially inwardly toward the central axis of the holding element. A convex contour portion which forms the largest reduction of the inner diameter of the constriction will follow. In turn, there will follow the second concave contour portion. Such a harmonic geometric design of the inner contour of the holding element along its longitudinal extension enables the plastic injection molding and, resp., the base formed in this way to adhere to the inner wall of the holding element solely by the aforementioned inner contour of the holding element and, resp., to abut safely on the holding element vis-à-vis an inadvertent axial relative movement and/or also a radial torsion movement. Thus, it is also possible that the holding element need not have any additional geometrically designed anti-twist protection, as this is known from the state of the art, for example, for a polygonal cross-section of the inner diameter of the holding element.

In one exemplary arrangement, on both sides of the constriction areas of the inner wall are connected which are formed substantially parallel to the central axis of the holding element, and first, second and third radii of curvature of the inner wall determine the shape of the constriction, the second radius of curvature defining the narrowest point of the constriction and in particular each of the radii of curvature having the same value, for example of 2.0 mm. Such a design of the contour of the inner wall of the holding element, mainly in the area of the constriction, equally results in an extremely harmonic geometric design of the inner wall and in corresponding afore-mentioned advantages. Said harmonic design of the contour is even positively promoted by all three radii of curvature having the same value.

The holding element may have a first bead that extends radially inwardly in the form of the constriction on the inner side of the holding element, wherein, along the longitudinal axis spaced apart from the first bead, a second bead extends radially outwardly on the outside of the holding element, for example, the first bead forming a stop for the igniter and/or the bead and/or the second bead being a stop against a closure bottom and/or an ignition cap.

As already described in the foregoing, the first bead in the form of the constriction may constitute a desired bottleneck for the igniter and/or the base. In this way, it is possible that, in the case of operation of the gas generator, a strongly increasing pressure is functionally formed in the gas generator and acts from the side of the first opening of the holding element upon the igniter and/or the base. The first bead then can act like a stop or a geometric stop member for the igniter and, resp., the base so that said elements cannot be pressed out or forced inadvertently through the bottleneck into the environment of the gas generator.

The second bead can so-to-speak have a double function as stop member, by the holding element on the one hand being inserted, when being mounted in another component such as a closure bottom having a passage, into said component (the passage thereof). Here the holding element then can be inserted into the further component only until the second bead acts as a mechanical stop or stops further insertion. On the other hand, yet another component, such as an ignition cap, can be attached along the outer wall of the holding element above the holding element only until said other component mechanically abuts against the second bead and can be stopped there.

In the gas generator, a cup-shaped diffusor having second flow orifices can be closed by the closure bottom, wherein a passage of the closure bottom is closed by the ignition unit, for example by welding in the holding element, and in one exemplary arrangement, the diffusor and the closure bottom can form with the ignition unit a major part of the outer housing of the gas generator. This design can help form or manufacture specifically the outer housing of the gas generator by only few components and few joining steps. This is the case in particular when the ignition unit is supplied already as pre-assembled group, or even the ignition unit including the membrane sealing the inner first opening of the holding element is supplied as pre-assembled unit.

In particular, a/the ignition cap with first flow orifices inside the gas generator is movably positioned on the outside of the holding element so that, after activating the gas generator, an area of the outside of the holding element serves as a guide for shifting the ignition cap in a shifting direction. Hence, the ignition cap is intended to be shifted as specified during operation of the gas generator. Accordingly, the ignition cap can be shifted, starting from an idle position in which it may rest on the second bead, in a shifting direction away from the second bead. For performing said shift in a precise and reproducible manner, advantageously the outer contour and, resp., the outside of the holding element serves as guide element for such a shift.

Inside the ignition cap, an ignition chamber with a first propellant may be formed, wherein particularly between the/a conical area of the holding element and the ignition cap an area of the ignition chamber tapering toward the first flow orifices of the ignition cap is formed. The fact that in particular such tapering area of the ignition chamber is formed allows, after activation of the gas generator when the first propellant is ignited and generates gas and/or particles as intended, said gas and/or particles to be transported or to flow extremely efficiently and quickly to and through the first flow orifices so that afterwards another second propellant can be quickly ignited. By forming such a tapering area of the ignition chamber, said constricting area advantageously acts like a nozzle which can accelerate the gas and/or the particles.

In one exemplary arrangement, an annular combustion chamber with a second propellant can be formed to surround the ignition cap, wherein the combustion chamber is delimited from the diffusor and the closure bottom against the environment of the gas generator and a filter and/or a volume compensation arrangement is/are accommodated in the combustion chamber. Specifically, each of the two propellants, the first and second propellants, can comprise as a filling of individual propellant bodies, e.g., pressed, particularly dry-pressed, propellant pellets or extruded bodies, but can also be provided in the form of broken granules or in the form of a monolithic molded body or in the form of stringed disks or rings. The first and second propellants moreover can be similar as to their chemical composition and/or their shape or can be different from each other in this respect.

An independent aspect of the disclosure relates to an airbag module comprising a gas generator, an airbag inflatable by the gas generator and a fastening mechanism for attaching the airbag module to a vehicle, the gas generator being designed in the above-described manner.

There is further disclosed and claimed, within the scope of the present application, a vehicle safety system, in particular for the protection of a person such as a vehicle occupant or pedestrian, comprising a gas generator, particularly as part of an airbag module or as part of a seat belt system or as part of an actuator component, and comprising an electronic control unit by which the gas generator can be activated, if a trigger situation is given. In the vehicle safety system according to the disclosure, the gas generator is designed in the above-described manner. For example, the gas generator can be used, when it is part of an actuator component, as an actuator for a hood prop in which, in the case of activation, a hood of a vehicle is propped up and, resp., quickly lifted to protect a person. Accordingly, also a use as actuator for a battery disconnecting system in which an electric circuit is quickly disconnected for safety reasons, or as actuator for an activatable headrest is included, wherein a headrest can be displaced extremely quickly over a certain distance.

BRIEF DESCRIPTION OF DRAWINGS

In the following, the disclosure shall be illustrated in detail on the basis of exemplary arrangements with reference to the attached schematic Figures, wherein.

DETAILED DESCRIPTION

Hereinafter, like reference symbols are used for like and equally acting parts.

Figure 1:
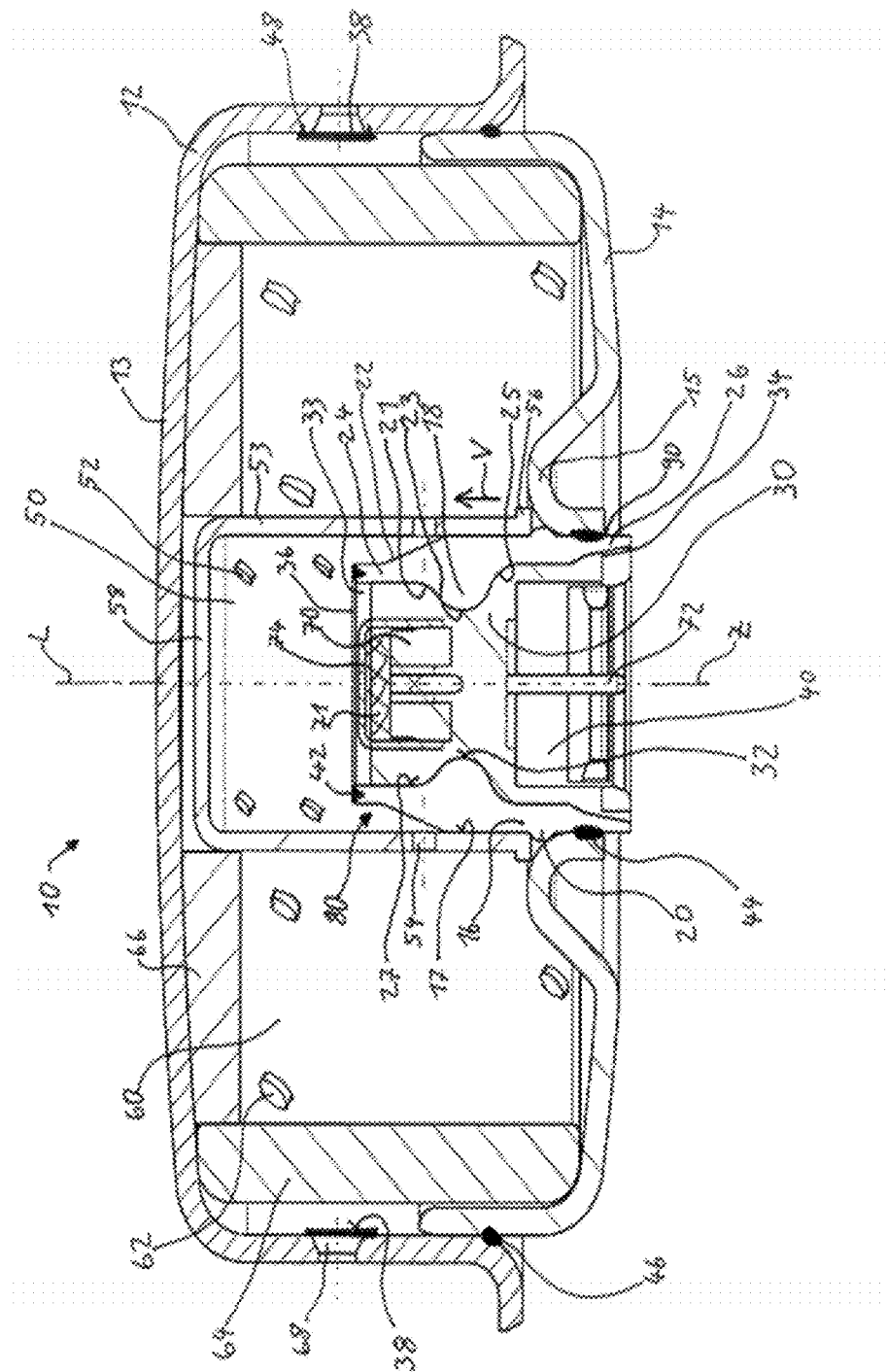
FIG. 1 shows a longitudinal section view across a gas generator according to the disclosure.

FIG. 1 shows a longitudinal section across a gas generator 10 according to the disclosure having a longitudinal axis L along which the gas generator 10 extends in the axial direction and which specifically also constitutes a central axis of the gas generator 10. The gas generator 10 has a cup-shaped diffusor 12 with a diffusor bottom 13 to which a radially peripheral sidewall including second flow orifices 68 is connected, the flow orifices 68 being closed by a radially peripheral plugging 38 using a fourth joint 48 which in one exemplary arrangement is a peripheral welded joint but may also be an adhesive joint. The diffusor 12 is closed at its open side facing the diffusor bottom 13 by a closure bottom 14 using a third joint 46 which in one exemplary arrangement is a peripheral welded joint. The closure bottom 14 has a central opening being configured as a passage 90 and being closed by an ignition unit 80.

In one exemplary arrangement, the ignition unit 80 is a pre-fabricated, assembly group comprising a holding element 16, an igniter 70 and a base 30. The igniter 70 is held in the holding element 16 by a plastic injection molding forming the base 30. The ignition unit 80 can be manufactured by initially inserting the igniter 70 into the holding element 16 in the form of a hollow body and positioning the igniter 70 inside the holding element 16 spaced apart from the inner wall 27 thereof. After that, plastic material is injected between the igniter 70 and the inner wall 27, until the base 30 is formed and the igniter 70 is tightly fixed in the holding element 16. In other words, plastic material is injected between the igniter 70 and the inner wall 27 of the holding element 16 and, thus, the base 30 is manufactured. The base 30 adheres to or, resp., is injection-molded to the inner contour of the holding element 16 and, at the same time, tightly embeds the igniter 70. The ignition unit 80 is inserted and press-fitted with its holding element 16 in the passage 90 and is fastened there using a second joint 44, which also may be a peripheral welded joint. The diffusor 12, the closure bottom 14 and the ignition unit 80 together form substantially an outer housing of the gas generator 10.

It is applicable to the gas generator 10 that, prior to being activated, i.e., prior to its intended function, it should be designed to be tight to a certain extent against its environment and those environmental influences. By the aforementioned joints, viz. the second, third and fourth joints 44, 46, 48, already relatively proper sealing of the gas generator 10 against its environment is obtained, with the aforementioned joints 44, 46, 48 being located in the exterior of the gas generator 10, at least in the vicinity thereof. However, the gas generator 10 includes another sealing joint, viz. a first joint 42 which is supported inside the gas generator 10, relatively far away from its outer housing and is particularly not directly accessible from the environment of the gas generator 10. Concretely, a membrane 36 hermetically seals an inner first opening 33 of the holding element 16. The membrane 36 is fastened to the holding element 16 using the first joint 42. Accordingly, another additional sealing is provided specifically in the interior of the gas generator 10. In one exemplary arrangement, the membrane 36 is formed of a flat disk of metal and is welded onto the front side of the holding element 16. In one exemplary arrangement, a radially peripheral laser welding, which is located in the area of the first opening 33 is utilized.

The holding element 16 is an elongate sleeve-shaped hollow body having on one front side the first inner opening 33, wherein, on the opposite front side, a second opening 34 facing outward and being also attributed to the outer housing of the gas generator 10 is located. The holding element 16 is formed to extend harmonically along its inner contour and in the longitudinal axis along its inner wall 27. In one exemplary arrangement, there is no undercut. Rather, the inner contour is formed to be balanced by a concave-convex-concave path along the longitudinal extension of the holding element 16. Concretely, starting from the inner first opening 33, the inner wall 27 of the holding element 16 initially extends over a certain distance substantially in parallel to the central axis Z of the holding element 16. Subsequently, it is guided by a first radius of curvature 21 in curved shape concavely radially inwardly and then is transformed with a second radius of curvature 23 aligned opposite thereto into a point having the smallest inner diameter of the holding element 16 so as to form a curved convex constriction 32 there.

Subsequently, again a path of the inner contour of the holding element 16 formed to be curved concavely with a third radius of curvature 25 is following which, over a certain distance, again follows in a shape configured substantially parallel to the central axis Z of the holding element 16 which extends toward the second outer opening 34 of the holding element 16.

In one exemplary arrangement, all three radii of curvature 21, 23 and 25 have the same value, for example, a value of 2.0 mm. This helps form a particularly harmonic inner contour of the holding element 16. Especially advantageously, the base 30 is retained by extremely stable and consistent adhesion on the surface of the contour of the inner wall 27 of the holding element 16 and, thus, is protected against mechanical twist. In other words, the base 30 adheres particularly well and tightly by the above-mentioned configuration of the contour of the inner wall 27 of the holding element 16. It has turned out unexpectedly that a conventionally known geometrically formed anti-twist protection can be dispensed with due to said specific contour. What is meant is that a geometric configuration of the inner wall 27 which, when viewed in cross-section, would prevent the base 30 from radially twisting can be dispensed with. Such twisting could be introduced, e.g., by a plug (not shown) connected to the igniter 70 to the igniter 70 or, resp., by force transmission to the base 30, if a torsion movement, viz. oriented in the radially peripheral direction to the central axis Z of the holding element 16, was inadvertently carried out by such plug. In other words, the adhesion or adhesive friction of the base 30 vis-à-vis the contour of the inner wall 27 of the holding element 16 is so strong or, resp., sufficient that this is solely sufficient for a safe position of the base 30 vis-à-vis an inadvertent torsion movement of the base 30.

The radii of curvature may also have different values. For example, a value of 0.5 mm to 3 mm would be imaginable for the first radius of curvature 21, a value of 0.5 mm to 2 mm would be imaginable for the second radius of curvature 23 and a value of 1 mm to 2 mm would be imaginable for the third radius of curvature 25.

The holding element 16 has, in the area of its first opening 33, a first lengthening 24 projecting from the igniter 70 regarding its longitudinal extension. In other words, the first lengthening 24 projects axially from the igniter 70 over a certain distance. Concretely, the longitudinal extension of the igniter 70 is terminated there by a cap 74. Accordingly, the holding element 16 extends with its first lengthening 24 in the longitudinal direction beyond the cap of the igniter 70. This offers the advantage that, when assembling the gas generator 10, the somewhat sensitive cap 74 of the igniter 70 is protected before and, resp., when further components are mounted. What is meant here is that inside the cap 74 a sensitive ignitable element 71, such as in the form of pyrotechnics, may be positioned and a strong mechanical contact of the cap 74 with other components should be avoided when assembling the gas generator 10. In the case of the present gas generator 10 it is advantageously possible to fabricate the ignition unit 80 as a pre-assembled group and to supply the same as bulk material, for example in a spiral conveyor, to the assembly of the gas generator 10. Accordingly, mechanical contacts may naturally occur between individual pre-fabricated individual ignition units. In this case, the afore-mentioned configuration of the first lengthening 24, i.e., the first lengthening 24 projecting from the igniter 70 as to its longitudinal extension, can show to advantage as mechanical protection for the igniter 70 and the cap 74 thereof, respectively.

A second lengthening 26 of the holding element 16 is positioned axially opposite to the first lengthening 24 and encloses the second outer opening 34 of the holding element 16. The second lengthening 26 can enclose an interface 40 formed inside the holding element 16 for a plug (not shown) connectable to the gas generator. Concretely, the second lengthening 26 can serve with its inner wall for receiving the plug which can be connected to one or more contact elements 72 of the igniter 70 to make an electric connection to a control device (not shown) for activating the gas generator 10. In addition, the holding element 16 can be fastened, in or by the outer area of the second lengthening 26, to the closure bottom 14 using the second joint 44.

The holding element 16 includes a first bead 18 extending radially inwardly in the form of the constriction 32 on the inner side of the holding element 16. Thus, the first bead 18 constitutes a hump-like narrowing inside the holding element 16 and thus can advantageously form, in the case of operation of the gas generator 10, a type of stop or stop member for the igniter 70 and, resp., the base 30. What is meant is that, with the intended operation of the gas generator 10, inside the gas generator 10 gas generated there forms a certain pressure which can act upon the igniter 70 and/or the base 30 also from the first opening 33 of the holding element 16. The first bead 18 and, resp., the constriction 32 formed in this way advantageously prevent the igniter 70 and/or the bead 30 from being unwantedly pressed or forced out into the environment of the gas generator.

A second bead 20 is formed in the longitudinal axis spaced apart from the first bead 18 on the outside of the holding element 16 extending radially outwardly. The second bead 20 can advantageously form a mechanical stop against further components in two ways. On the one hand, it can act, when mounting the holding element 16 and, resp., the pre-assembled ignition unit 80, with the closure bottom 14 as a stop or stop member, as the holding element 16 and, resp., the ignition unit 80 is inserted "to the stop" through the passage 90 of the closure bottom 14 so that an axial defined position of the holding element 16 and the ignition unit 80, respectively, can be obtained.

On the other hand, the second bead 20 can act as a mechanical stop against or for an ignition cap 53 which is attached or press-fitted onto the outside of the holding element 16. The ignition cap 53 has a radially outwardly projecting flange 56 which can abut against the second bead 20 during the afore-mentioned assembly of the ignition cap 53. The ignition cap 53 has a substantially flat cap bottom 58 to which a peripheral sidewall having first flow orifices 54 is connected. The ignition cap 53 is attached, when being mounted to or onto the holding element 16, over a certain axial distance with the inner face of its sidewall onto the holding element 16 such that, in the case of operation of the gas generator 10, the ignition cap 53 is movably supported along a shifting direction V which is aligned substantially in parallel to the longitudinal axis L of the gas generator 10.

The ignition cap 53 forms, in its interior, an ignition chamber 50 which is filled with a first propellant 52. Concretely, the ignition chamber 50 is formed through the interior of the ignition cap 53 and the contour of the ignition unit 80 accommodated therein with the membrane 36 fastened thereto. Around the ignition cap 53, an annular combustion chamber 60 comprising a second propellant 62 is formed, wherein the combustion chamber 60 is delimited by the diffusor 12 and the closure bottom 14 against the environment of the gas generator 10 and further accommodates a filter 64 and a volume compensation arrangement 66. The two propellants (52, 62) are shown merely symbolically in FIG. 1. In the present case, both of them are provided as loose bulk material of individual propellant bodies and fill the chambers assigned to them substantially completely. Thus, the ignition chamber 50 is filled with the first propellant 52 and the combustion chamber 60 is filled with the second propellant 62. The volume compensation arrangement 66 is formed of elastic material, such as silicone or a knitted metal mesh, and buffers tolerances when the combustion chamber 60 is filled with second propellant 62, wherein it exerts moreover a certain mechanical bias upon the bulk material of the second propellant 62 so that the propellant bodies cannot make any movements relative to one another in the idle state of the gas generator 10, i.e., before the latter is activated.

The intended function of the gas generator 10 is as follows. After activating the gas generator 10 from the idle state thereof, using the igniter 70 hot ignition gas and/or ignition particles is/are released out of the igniter 70 by tearing or locally opening the cap 74 of the igniter 70. Ignition gas and/or ignition particles break or open the hermetically sealing membrane 36 and flow into the ignition chamber 50 to ignite the first propellant 52. Accordingly, the first propellant 52 is ignited and chemically reacted, and gas and/or particles are generated which, on the one hand, contribute to an overall gas production of the gas generator 10 but, on the other hand, are mainly used in this case to flow through the first flow orifices 54 of the ignition cap 53 into the combustion chamber 60 to ignite the second propellant 62 there.

By the reaction of the first propellant 52, inside the ignition chamber 50 a rapidly increasing pressure is formed which moves and actuates the ignition cap 53 in the shifting direction V. This is advantageously intended in this way so that the first flow orifices 54 are so-to-speak also moved along and a larger area of the second propellant 62 can be ignited in a more optimized manner by the gas and/or the particles flowing in from the first flow orifices 54. When shifting the ignition cap 53, advantageously a certain external region of the holding element 16 is configured as a guide 17 for the ignition cap 53 so that the latter can be axially shifted extremely precisely and foreseeably in the linear direction. In the area of the first flow orifices 54 of the ignition cap 53, the outer wall of the holding element 16 opposite thereto is formed over a certain area with a radially outwardly extending conical area 22. Thus, a region of the ignition chamber 50 is resulting which is configured to be tapered toward the first flow orifices 54. In other words, a kind of nozzle-type narrowing of the ignition chamber 50 toward the first flow orifices 54 is formed, allowing the gases and particles which are intended to flow through the first flow orifices 54 to be advantageously accelerated and, thus, to ignite the second propellant 62 even more quickly. High pressure buildup in the combustion chamber 60 can advantageously help deform the closure element 14 elastically and/plastically in a curved region which is configured as a bulge 15 to so-to-speak cushion said pressure buildup.

Finally, by the ignition and reaction of the second propellant 62, the majority of the gas is generated which is intended to be provided by the gas generator 10. At first, said gas is cooled and/or purified by the filter 64 located in the combustion chamber 60, before it opens and, resp., breaks through the tight plugging 38 and leaves the gas generator 10 toward the environment thereof through the second flow orifices 68 of the diffusor 12.

The number and the position of the first flow orifices 54 in the ignition cap 53 and of the second flow orifices 68 in the diffusor 12 are shown merely symbolically in the Figures. In the illustrated arrangement, the flow orifices 54, 68 are configured in a row as round holes to be radially peripheral and equally spaced apart from each other. It is also possible, however, that those parameters may be different and may be reasonably combined with one another at will, as is known from the state of the art. It is conceivable, for example, that portions of the flow orifices 54, 68 may be different in shape and/or size and may be arranged to be radially peripheral in plural peripheral rows, particularly having the orifices offset against each other.

Figure 2:
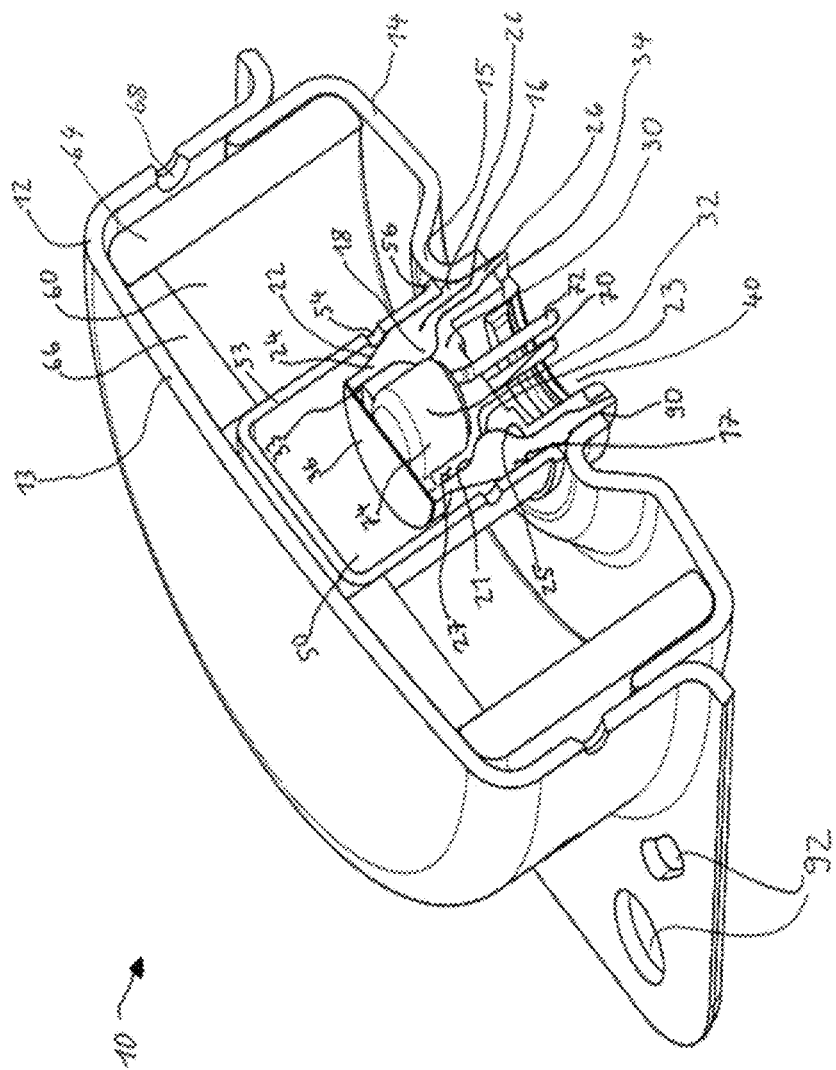
FIG. 2 shows a three-dimensional representation of the gas generator as shown in FIG. 1.

FIG. 2 illustrates the same exemplary arrangement of the gas generator 10 as shown in FIG. 1 in a perspective view. Accordingly, the same reference symbols as in FIG. 1 are used for like and equally acting parts. In particular, in FIG. 2 two further openings 92, which may be in the form of a bore or slit, are shown in a radially outwardly extending flange-type configuration of the diffusor 12, which may serve for fastening the gas generator 10 to an airbag module (not shown).

The invention claimed is:

1. A gas generator for a vehicle safety system, comprising:
    an ignition unit including a holding element, an igniter and a base,
    wherein the base is formed by one single plastic injection molding so that the igniter is embedded in the base and the base is injection-molded to the holding element;
    wherein a membrane is provided which hermetically seals an inner first opening of the holding element;
    wherein a cup-shaped diffusor having second flow orifices is closed by a closure bottom,
    wherein a passage of the closure bottom is closed by an ignition unit by welding the holding element and
    wherein the diffusor and the closure bottom with the ignition unit form a major part of an outer housing of the gas generator;
    wherein an ignition cap has first flow orifices inside the gas generator and is movably positioned on an outside of the holding element such that, after activating the gas generator, an area of the outside of the holding element serves as a guide for shifting the ignition cap in a shifting direction; and
    wherein inside the ignition cap an ignition chamber with a first propellant is formed,
    wherein between a conical area of the holding element and the ignition cap an area of the ignition chamber tapering toward the first flow orifices of the ignition cap is formed.

2. The gas generator according to claim 1,
    wherein the holding element is configured as an elongate sleeve-shaped hollow body comprising the inner first opening which is located inside the gas generator, and a second opening opposite thereto on a front side, wherein the holding element and the membrane are made from metal and are materially connected by a first joint.

3. The gas generator according to claim 2, wherein the membrane is in the form of a planar disk.

4. The gas generator according to claim 1,
    wherein the holding element is free from an undercut along outer and inner contours, and/or the base extends invariably along an inner wall of the holding element.

5. The gas generator according to claim 1,
    wherein on an inner wall of the holding element, a constriction through which the igniter extends at least in portions is formed, wherein, when viewed in a longitudinal section, the constriction is curved toward a central axis of the holding element such that a concave-convex-concave contour forms along the inner wall, wherein the holding element is free from a geometrically formed anti-twist protection for the igniter and/or the base.

6. The gas generator according to claim 5,
    wherein areas of the inner wall which are formed substantially in parallel to the central axis of the holding element are connected on both sides of the constriction, and first, second and third radii of curvature of the inner wall determine the shape of the constriction, the second radius of curvature defining the narrowest point of the constriction and each of the radii of curvature has the same value.

7. The gas generator according to, claim 1,
    wherein the holding element has a first bead extending radially inwardly in the form of a constriction on the inside of the holding element, wherein, spaced apart from the first bead along a longitudinal axis, a second bead extends radially outwardly on the outside of the holding element such that the first bead forms a stop for the igniter and/or the base.

8. The gas generator according to claim 7, wherein the second bead is a stop against a closure bottom and/or an ignition cap.

9. The gas generator according to claim 1,
    wherein an annular combustion chamber with a second propellant is formed to surround the ignition cap, wherein the combustion chamber is delimited by the diffusor and the closure bottom against an environment of the gas generator and a filter.

10. The gas generator according to claim 9, wherein a volume compensating mechanism is accommodated in the combustion chamber.

11. An airbag module comprising a gas generator, an airbag inflatable by the gas generator and a fastening arrangement for attaching the airbag module to a vehicle,
    wherein the gas generator is configured according to claim 1.

12. A vehicle safety system for protection of a person, comprising a gas generator and an electronic control unit by which the gas generator can be activated when a situation of release is given, wherein the gas generator is configured according claim 1.

13. The vehicle safety system of claim 12, wherein the gas generator is part of one of an airbag module, a seat belt system and a part of an actuator component.

14. The gas generator according to claim 1, wherein the ignition unit is fabricated as a pre-assembled group.

* * * * *